Oct. 1, 1957  J. DOLZA  2,808,041
ENGINE
Filed Dec. 31, 1954  4 Sheets—Sheet 4
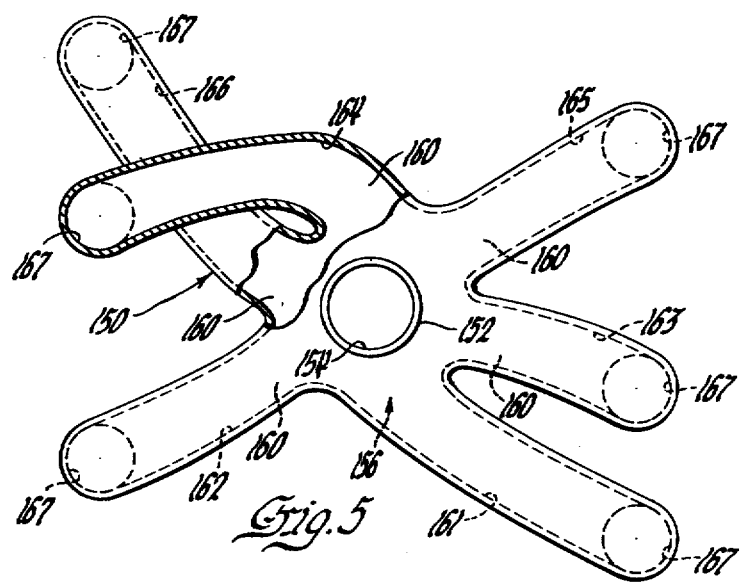
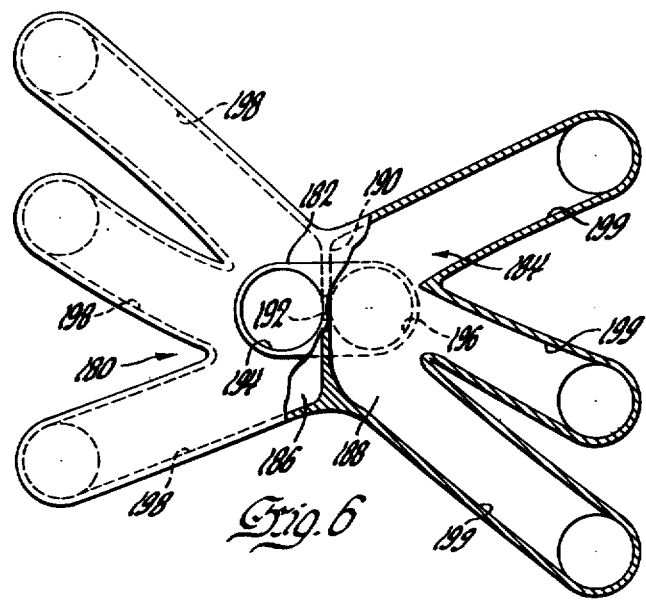
INVENTOR
John Dolza
BY L. I. Burch
ATTORNEY

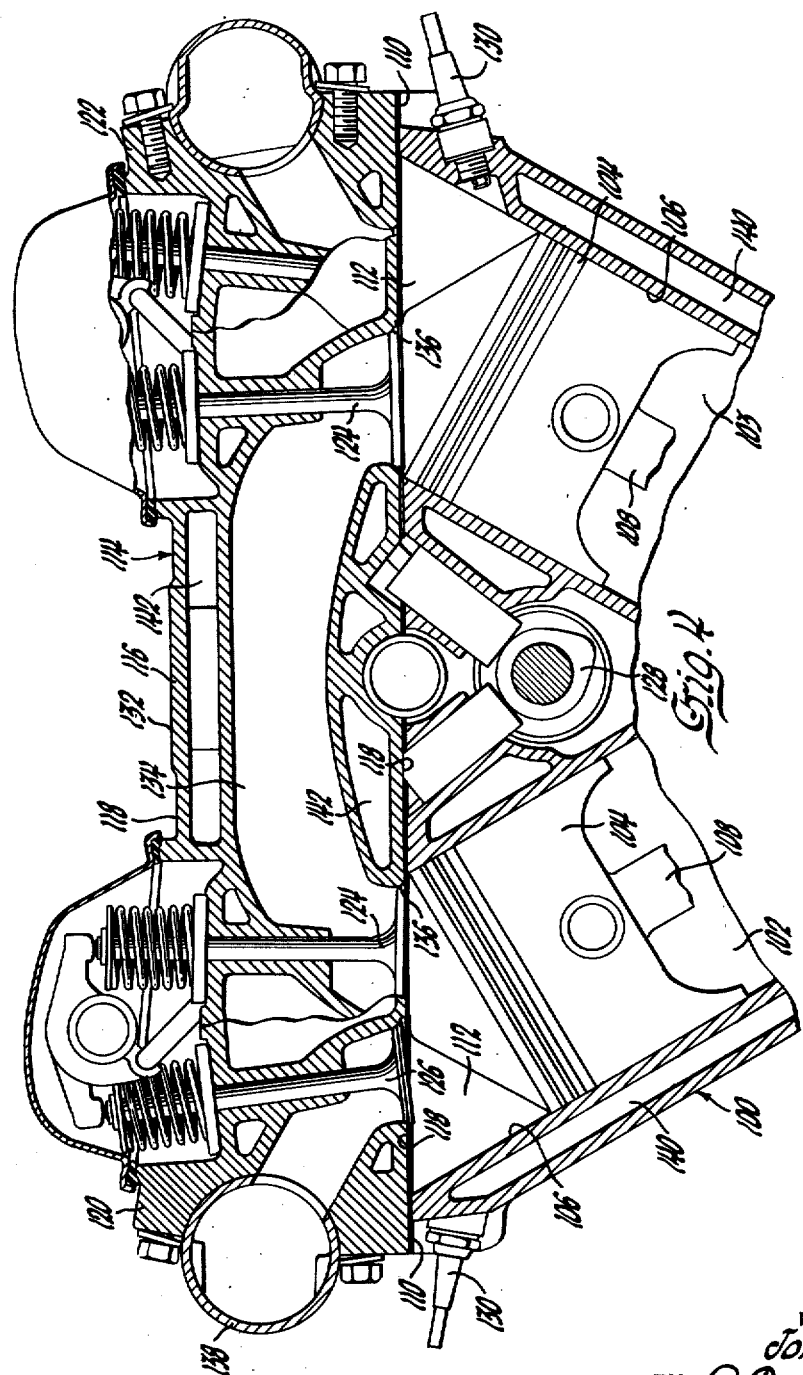

United States Patent Office 2,808,041
Patented Oct. 1, 1957

2,808,041

ENGINE

John Dolza, Davisburg, Mich., assignor to General Motors Corporation, Detroit, Mich., a corporation of Delaware Application December 31, 1954, Serial No. 478,956

18 Claims. (Cl. 123—52)

The present invention relates to internal combustion engines and more particularly to the induction systems therefor.

In the operation of an internal combustion engine of the spark ignited type, a combustible charge is normally formed in a carburetor and distributed to the various cylinders by means of an intake manifold. In order to obtain the maximum power from the engine, the induction system must provide a high volumetric efficiency so each of the cylinders will obtain the maximum charge. In addition, the intake manifold must be constructed so that each of the cylinders will receive substantially identical charges.

It is therefore proposed to provide an intake manifold which is particularly adapted for use on so-called "V-type" engines. The manifold will insure each of the cylinders receiving the maximum charge and further, that each of the charges will be substantially identical to each other. The intake manifold may be disposed between the banks of cylinders with the distribution passages forming ports on the opposite sides which are positioned to register with the intake ports in the cylinder heads.

A carburetor riser may be provided in the center of the manifold to form a distributing chamber. A plurality of distribution passages may radiate from the chamber with each of these passages communicating with one of the cylinders. As a result, all of the distribution passages may be very short and of substantially the same size and shape. The only turn which the charge will negotiate while flowing to the intake ports will be a substantially right angle turn at the point where the distribution passages intersect the chamber. This manifold may thereby insure a high volumetric efficiency and substantially uniform charging of all of the engine cylinders.

If desired, the distribution chamber may be substantially cylindrical and the distribution passages may intersect the distribution chamber at circumferentially spaced points that are so disposed that the charging of the various cylinders will induce the charge to flow in a unidirectional cyclonic pattern. This will further improve the volumetric efficiency of the induction system by eliminating the momentum encountered in starting and stopping the flow of the charge in the induction system. In addition by causing the charge to always flow in the same direction, a ram effect may be created in the distribution passages for supercharging the engine.

In engines of the so-called "V-type," the cylinders are positioned in a cylinder block to form two angularly disposed banks of cylinders. These cylinders extend through the block with the outer ends thereof producing rows of aligned openings in faces on the opposite sides of the block. A cylinder head is then normally secured to each of these faces and the intake manifold is disposed between the heads. This form of construction results in several separate parts which must be separately handled during assembly of the engine. Also, in addition to increasing the number of parts handled and accordingly, the cost of the engine, there are several junctions between these parts. Consequently, gaskets must be provided to seal the junctions and also there may be misalignment of the various portions of the induction passages particularly between the cylinder heads and the intake manifold. Such misalignment will increase the flow resistance and materially impair the operation of the engine.

It is now proposed to provide a unitary structure which will function as a combined intake manifold and cylinder heads thus reducing the number of parts and the cost of the engine. Moreover, this will permit the induction passages between the carburetor and the intake valves to be one continuous passage free from any irregularities such as joints therein. Since these intake passages will be free of any interruptions, the resistance to the flow of the combustible charge therethrough will be maintained at a minimum and insure a high volumetric efficiency for the engine.

In the drawings:

Figure 4 is a cross sectional view of an engine embodying a modification of the manifold.

Figure 5 is a diagrammatic view of a modified form of the intake manifold.

Figure 6 is a diagrammatic view of another modification of the intake manifold.

Figure 1:
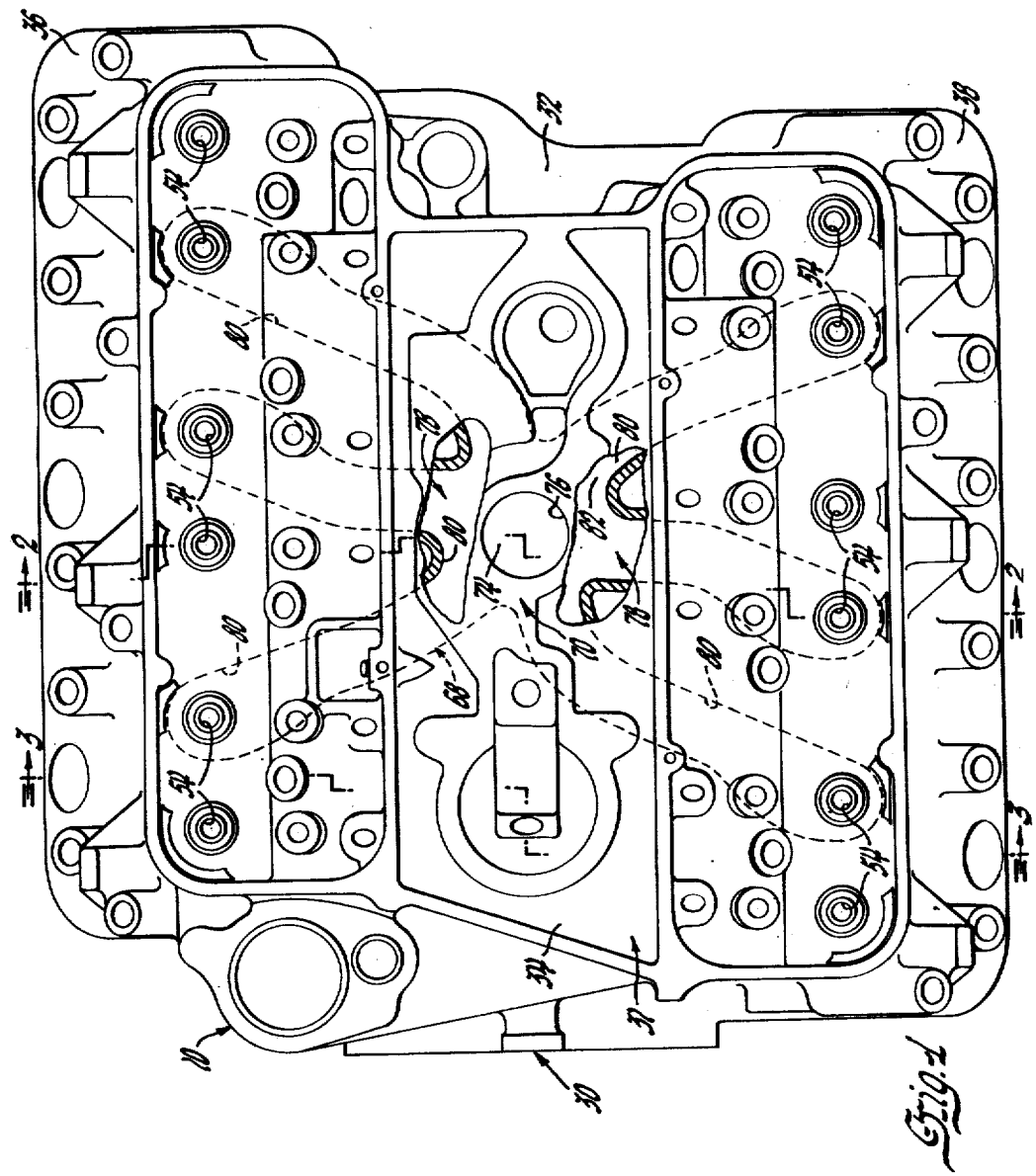
Figure 1 is a plan view of an intake manifold embodying the present invention with portions thereof being broken away.
Figure 2:
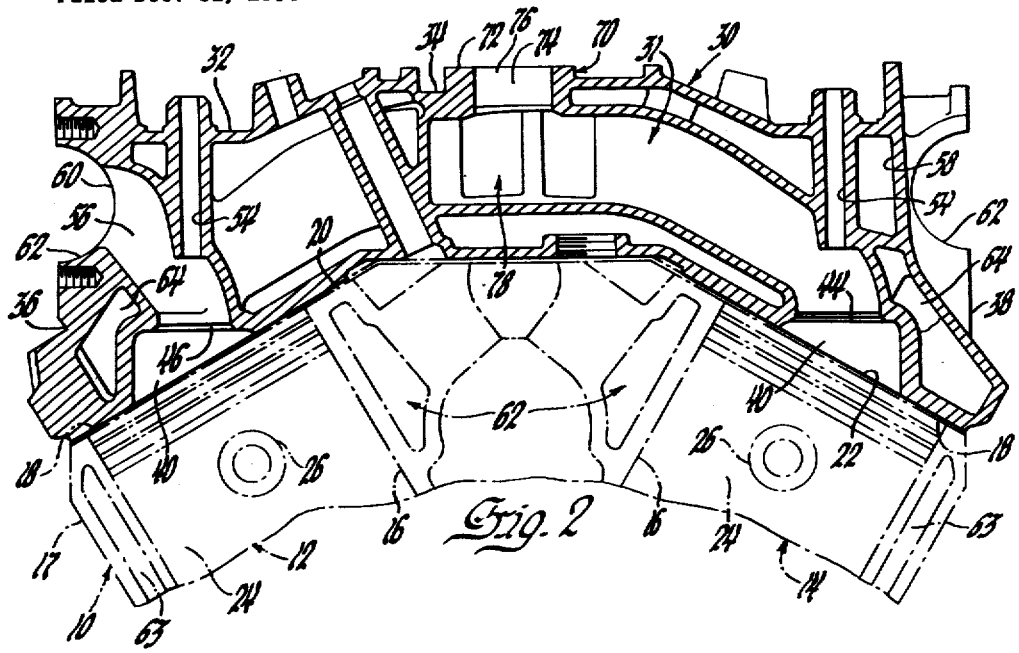
Figure 2 is a cross sectional view of the intake manifold taken substantially along the plane of line 2—2 in Figure 1.
Figure 3:
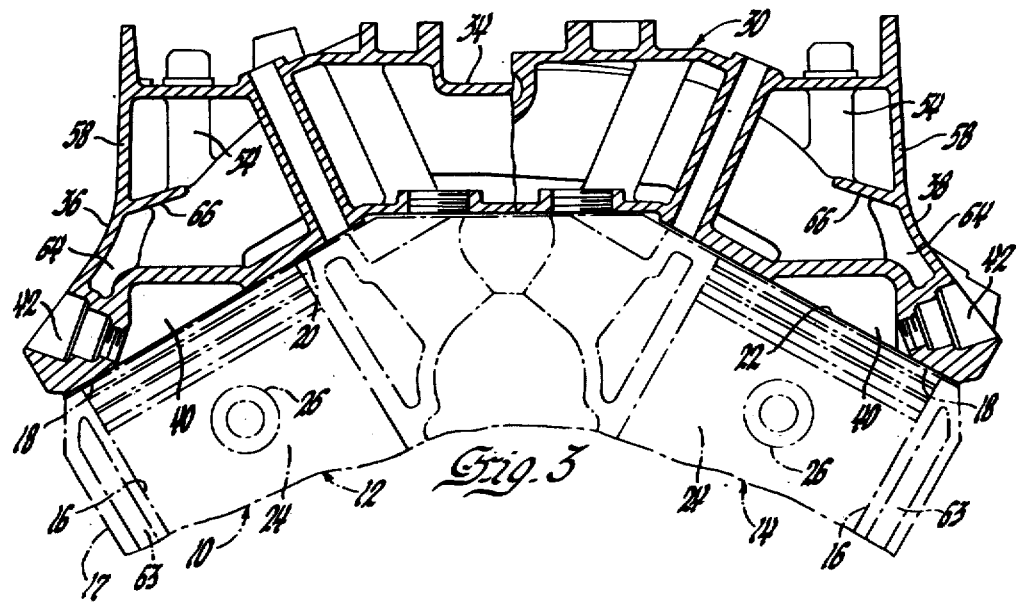
Figure 3 is a cross sectional view of the intake manifold similar to Figure 2 but taken substantially along the plane of line 3—3 in Figure 1.

The present invention may be embodied in any suitable engine 10 having two banks 12 and 14 of angularly disposed cylinders 16 in a cylinder block 17. In the present engine 10 these banks 12 and 14 are disposed at substantially 60° to each other with each of the banks including three cylinders 16. Of course it should be understood that the engine 10 may include any number of cylinders and the angle therebetween may be of any desired magnitude. The cylinders may be numbered by starting at one end of the engine and proceeding in the order of their remoteness from that end. Thus the even numbers will be on one side and the odd numbers on another side. The upper ends of the cylinders 16 in each bank may form rows of openings 18 in the faces 20 and 22 extending along the sides of the cylinder block 17.

Each cylinder 16 may have a piston 24 reciprocably disposed therein. Each piston 24 may be provided with a wrist pin 26 that is adapted to receive the upper end of a connecting rod. The lower end of the connecting rod may be attached to a crankshaft. The crankshaft may be disposed in a crankcase which is formed by the space below the cylinders and is enclosed by an oil pan. The upper ends of the pistons 24 may have any desired shape such as a plane surface.

An induction system 30 may be provided on top of the engine 10 for developing and distributing a combustible charge to engine cylinders 16. In the present instance this system 30 includes a manifold structure 31 that comprises a member 32 having a center portion 34 adapted to be disposed between the two banks 12 and 14 and edge portions 36 and 38 adapted to seat on the faces 20 and 22 on the sides of the engine 10. Each of the edge portions 36 and 38 may be provided with a plurality of cavities 40 that are positioned to register with the openings 18 formed by the cylinder 16. Thus these cavities 40 may cooperate with the upper ends of the pistons 24 and cylinders 16 to form a plurality of combustion chambers.

A plurality of threaded passages 42 may extend through the opposite sides of the member 32 to form mountings for the spark plugs having the electrodes projecting into the combustion chambers. Intake and exhaust valve seats 44 and 46 may be provided in the walls of the combustion chambers. Poppet valves may be disposed in these seats 44 and 46 with the stems being disposed in the guides 54 for actuation by rocker arms and push rods driven by the camshaft. Exhaust passages 56 may extend inwardly from the opposite side walls 58 of the edge portions 36 and 38 with the inner ends thereof communicating with the exhaust valve seats 46. The outer ends of these passages 56 may form exhaust ports 60 that will discharge into an exhaust manifold that is secured in a recess 62 extending along the side walls 58. It should be noted that this will permit a very short and substantially straight exhaust passage 56 for interconnecting the exhaust valve with the exhaust port 60. This will not only reduce the amount of exhaust gas pressure present at the exhaust valve but in addition it will reduce the amount of exhaust passage 56 in heat exchanging relation with the cooling system. Thus there will be a minimum of heat rejection from the exhaust passage into the cooling system. However, since the exhaust passage 56 extends upwardly toward the side, the cooling jacket 63 may include a passage 64 that extends completely around the exhaust passage 56 in the area forming the exhaust valve seat 46. A fin 66 may be provided which reinforces the valve guide 54 and at the same time will divert a flow of coolant into the passage 64 between the exhaust valve and the side walls 58 of the edge portions 36 and 38. This will insure heat being absorbed from the entire periphery of the exhaust valve 46 and the elimination of any steam pockets.

The induction system 30 for charging the cylinders 16 may be disposed in the space between the banks 12 and 14. This includes an intake manifold 68 formed in the inside of the center portion 34 of the manifold structure 31. This structure 31 includes a member 32 having a carburetor riser 70 in the middle thereof which forms a mounting flange 72 adapted to receive a suitable carburetor. In the present instance this carburetor is of the so-called downdraft type having a single mixture supply passage extending therethrough. However, it should be understood that the carburetor may be a compound one having more than one mixture supply passage therein. A vertical supply passage 74 may extend through the riser 70 to form an opening 76 in the mounting flange which communicates with the supply passage in the carburetor. The lower end of this passage may be enlarged to form a distribution chamber 78 that will collect the charge flowing out of the mixture supply passage. The bottom of this chamber 78 is preferably planar and the walls preferably form a vertical cylinder.

A plurality of distribution passages 80 may be formed in the center portion 34 of the member 32 for interconnecting the distribution chamber 78 with the intake valves. In the present instance the inner ends of these passages 80 form openings 82 in the side walls of the distribution chamber and the outer ends communicate with the combustion chambers 40. The openings 82 are preferably equally spaced circumferentially around the wall of the chamber 78. The outer end of each of these passages 80 may form a valve seat 44 that receives an intake valve 48 for controlling the flow of the charge into the combustion chamber. Each of the passages 80 is substantially straight so as to radiate radially from the chamber 78. Thus it will be seen that the distance the charge has to travel from the carburetor to each cylinder will be substantially equal. Moreover, the only turn that the charge will have to negotiate between the carburetor and the intake valves 44 will be where it flows from the vertical supply passage 74 into the various distribution passages 80. Any fuel particles that are not thoroughly mixed with the charge may be centrifugally thrown from the charge during this turn. The particles so separated will then collect in the bottom of the chamber 80 to form a pool. The fuel in this pool may then be reevaporated into the charge. It may be seen that there will be little resistance to the charge flowing through the induction system. Thus each of the cylinders will receive identical charges and a high volumetric efficiency will be insured.

If desired the jacket 63 may include cooling passages 84 that permeate the entire structure including the center portion 34. Thus there will be portions of the cooling system in heat exchanging relation with the walls of the distribution passages 80 and chamber 78. Consequently, any fuel particles which fail to remain in the charge and fall out of the charge will settle on the heated walls and be immediately reevaporated into the charge.

Another embodiment of the present invention is illustrated in Figure 4. This embodiment is adapted to be incorporated in an engine having a cylinder block 100 with a pair of angularly disposed cylinder banks 102 and 103 provided therein.

A piston 104 may be disposed in each of the cylinders 106 and connected to a crankshaft by means of connecting rods 108. The present cylinder block 100 includes a plane surface 110 that extends completely across the top thereof. Thus the cylinders 106 will extend upwardly through this face 110 to form a pair of parallel rows of cavities 112 along the opposite sides thereof.

A manifold structure 114 may be provided on top of the cylinder block 100. This structure 114 includes a member 116 having a plane surface 118 on the bottom thereof that is adapted to seat on the plane face 110 formed on the top of the cylinder block 100. The member 116 may include a center portion 118 and a pair of edge portions 120 and 122. The center portion 118 may be disposed over the space formed between the cylinders 106 while the edge portions 120 and 122 are adapted to close the cavities 112 formed by the cylinders 106. The upper ends of the pistons 104 may have any desired shape; however, in the present instance they have a domed surface that forms a prism-shaped combustion chamber.

Intake and exhaust valves 124 and 126 may be disposed in the edge portions 120 and 122 for controlling the ingress and egress of the charge in and out of the combustion chamber. The position of the valves 124 and 126 may be controlled by a camshaft 128 disposed in the space between the cylinders 106 and driven by the crankshaft. A spark plug 130 may extend inwardly through the sides of the cylinder block 100 for igniting the charge in the large end of the combustion chamber.

A carburetor riser 132 may be formed in the center portion 118 of the manifold structure 114. This riser 132 may form a mounting flange for supporting a carburetor that discharges into a vertical supply passage. This supply passage may communicate with distribution passages 134 that have the outer ends thereof forming intake valve seats 136 in a wall of the combustion chamber. The exhaust valve 126 may control the flow of exhaust gases into the exhaust manifold 138.

The cooling system 140 may include a plurality of passages 142 that permeate the entire manifold structure so as to be in heat exchanging relation with the walls of the distribution passages 134.

Another embodiment is shown in Figure 5. This is a manifold 150 that may be incorporated into a one piece manifold structure as in the previous embodiments. This manifold 150 includes a carburetor riser 152 in the center thereof which has a vertical fuel supply passage 154 therein. This passage 154 may form a distributing chamber 156 which communicates with a plurality of distribution passages 161, 162, 163, 164, 165 and 166. The inner ends of these passages may form openings 160 in the side walls of the chamber 156 while the outer ends 167 communicate with the intake valves for the various cylinders. This manifold is particularly adapted for an engine having a firing order of 1, 3, 5, 4, 6, 2. Accordingly, all of the passages radiate directly to the cylinders in a non-crossing relation except for the passages 164 and 166 to cylinders 4 and 6, which are crossed. Thus the passages will communicate with the chamber in a circumferential order such that the cylinders will draw the charge from the chamber in a rotating sequence. This will induce the charge to flow in an unidirectional cyclonic pattern. As a result the charge will always be in motion and this motion may cause the mass of the charge to ram it into the charging cylinder and produce a supercharging effect.

Another embodiment is shown in Figure 6. This is a manifold 180 which may be incorporated into a one piece manifold structure as in the previous embodiments. This manifold 180 includes a carburetor riser 182 in the middle thereof which forms a mounting flange in the center adapted to receive a carburetor. A chamber 184 may be provided below the riser 182 which is divided into two separate compartments 186 and 188 by a partition 190. An opening 192 may be provided for interconnecting the two compartments 180 together. A pair of vertical supply passages 194 and 196 may be provided so that each passage interconnects a mixture supply passage in the carburetor with one of the compartments 186 or 188.

Two sets of distribution passages 198 and 199 may be provided which interconnect the compartments 186 and 188 with the cylinders on the same side. These passages 198 and 199 preferably radiate substantially straight out from the chamber 184 in uncrossing relation. Thus the firing order may be 6, 5, 4, 3, 2, 1 or some similar order so that the passages to either compartment 186 or 188 will charge at equally spaced intervals. If this condition exists the three passages 198 may create a unidirectional cyclonic flow in the compartments 186, and the passages 199 will create a similar flow in compartment 188.

Various changes and modifications of the embodiments of the invention described herein may be made by those skilled in the art without departing from the spirit and principles of the invention.

What is claimed is:

1. An intake manifold adapted to be employed on an engine having a pair of angularly disposed banks of cylinders with three cylinders in each of said banks, said manifold comprising a member adapted to be disposed between said banks, a carburetor riser in the middle of said member and having a substantially vertical fuel supply passage extending therethrough, a chamber disposed immediately below said riser and communicating with said supply passage, six distribution passages having all of the inner ends thereof independently communicating with said chamber at substantially equally circumferentially spaced points, said passages radiating substantially horizontally from said chamber with the outer ends of each of said distribution passages being adapted to communicate with one of said cylinders for drawing the charge substantially radially from said chamber.

2. An intake manifold adapted to be employed on an engine having a pair of angularly disposed banks of cylinders, said manifold comprising a member having a fuel supply passage extending vertically therethrough with the lower end thereof forming a distribution chamber, and distribution passages extending substantially horizontally through said member, the outer ends of said passages being adapted to communicate with said cylinders, the inner ends of all of said passages communicating substantially independently from each other with said chamber substantially radial to the axis of said chamber to form openings in the sides of said chamber.

3. An intake manifold adapted to be employed on an engine having a pair of angularly disposed banks of cylinders with three cylinders in each bank, said cylinders being numbered by their remoteness from one end of said engine and having a firing order of 1, 3, 5, 4, 6 and 2, said manifold comprising a fuel supply passage extending vertically therethrough with the lower end thereof forming a distribution chamber, distribution passages extending horizontally from said chamber with the outer ends of said passages communicating with said cylinders, said distribution passages forming openings in the sides of said chamber, and said openings being disposed in an order of 1, 3, 5, 4, 6 and 2.

4. An intake manifold adapted to be employed on an engine having a pair of angularly disposed banks of cylinders, said manifold comprising a member adapted to be disposed between said banks, a carburetor riser in the middle of said member and having a pair of parallel fuel supply passages extending substantially vertically therethrough, a chamber in the middle of said member, a partition dividing said chamber into separate compartments with each of said fuel supply passages communicating with only one of said compartments, said partition having an opening therein for interconnecting said compartments with each other, two sets of distribution passages, each of said sets including a plurality of substantially horizontally extending passages having their inner ends communicating with one of said compartments and the outer ends adapted to communicate with the cylinders in one of said banks.

5. An intake manifold adapted to be employed on an engine having a pair of angularly disposed banks of cylinders with three cylinders in each bank, said manifold comprising a member adapted to be disposed between said banks, a chamber disposed below said riser and having a partition dividing said chamber into two separate compartments, a carburetor riser in the middle of said member and having a pair of parallel vertical supply passages with each of said supply passages communicating with one of said compartments, two sets of distribution passages, each of said sets including three distribution passages having their inner ends communicating with one of said compartments and the outer ends communicating with the cylinders on the same side of said engine as their respective compartments.

6. An intake manifold adapted to be employed on an engine having a pair of angularly disposed banks of cylinders, each of said banks including three cylinders that fire at equally spaced intervals, said manifold comprising a member adapted to be disposed between said banks, a chamber disposed in the middle of said member and having a partition dividing said chamber into two separate compartments, said partition having an opening therein for interconnecting said compartments with each other, a carburetor riser in the middle of said member having a pair of parallel vertical supply passages with each of said supply passages communicating with one of said compartments, three distribution passages communicating with each of said compartments with the outer ends of each passage communicating with a cylinder on the same side as its respective compartment.

7. An engine having a pair of angularly disposed banks of cylinders with said cylinders being numbered consecutively in order of their remoteness from one end of said engine and having a firing order of 6, 5, 4, 3, 2, 1, an intake manifold having a carburetor riser with vertical fuel supply passages communicating with each of said compartments and having three distribution passages communicating with each of said compartments and radiating from said riser in uncrossing relation to communicate with said cylinders.

8. An intake manifold structure for an engine having a cylinder block comprising a member having a center portion and edge portions, said edge portions having cavities positioned to register with openings formed in said cylinder block by the cylinders of an engine, said center portion including a carburetor riser and distribution passages communicating with said cavities and a plurality of coolant passages disposed in said member disposed in heat exchanging relation with said distribution passages and being adapted to communicate with the cooling system of said guide.

9. An engine comprising a cylinder block having at least one plane face and a pair of angularly disposed banks of cylinders forming openings in said faces, a structure having a center portion and edge portions, said edge portions having a plane surface to seat on said faces and including cavities positioned to register with the openings formed by said cylinders, said center portion including distribution passages communicating with said cavities and a cooling system in said structure in heat exchanging relation with said cavities and said distribution passages.

10. An engine comprising a cylinder block having a pair of angularly disposed banks of cylinders and a pair of plane faces with openings formed therein by said cylinders, a cooling system having a portion thereof in heat exchanging relation with said cylinders, a structure having a center portion and edge portions, said edge portions having plane surfaces adapted to seat on said faces and including cavities positioned to register with the openings formed by said cylinders, a carburetor riser disposed in the middle of said center portion and having a distribution chamber therein, distribution passages having the inner ends thereof communicating with said chamber and the outer ends thereof communicating with said cavities, said cooling system including passages disposed in heat exchanging relation with said distribution passages and chamber and said cavities.

11. An intake manifold structure adapted to be mounted on an engine having a cylinder block with a plane horizontal surface on the top thereof, said structure comprising a member having a plane surface adapted to seat on said face, said member including a center portion and edge portions, said edge portions having cavities therein positioned to register with the openings formed by said cylinders, said center portion including distribution passages communicating with said cavities.

12. An intake manifold structure adapted to be mounted on an engine having a cylinder block with a plane horizontal surface on the top thereof, said structure comprising a member having a plane surface adapted to seat on said face, said member including a center portion and edge portions, said edge portions having cavities therein positioned to register with the openings formed by said cylinders, said center portions including distribution passages communicating with said cavities, a plurality of cooling passages disposed in heat exchanging relation with the walls of said distribution passages and being adapted to communicate with the cooling system in said engine.

13. An engine comprising a cylinder block having a pair of angularly disposed banks of cylinders and a plane face with openings formed therein by said cylinders, a structure having a plane surface adapted to engage said face and having a center portion and edge portions, said edge portions having cavities positioned to register with the openings formed by said cylinders, said center portion including distribution passages communicating with said cavities and a cooling system in said structure in heat exchanging relation with said cavities and said distribution passages.

14. An engine comprising a cylinder block having a pair of angularly disposed banks of cylinders and a plane face with openings formed therein by said cylinders, a structure having a plane surface adapted to seat on said face and including a center portion and edge portions, said edge portions having cavities positioned to register with the openings formed by said cylinders, said center portion including a carburetor riser and distribution passages interconnecting said riser with said cavities, said cooling system including a plurality of passages in said structure in heat exchanging relation with said cavities and said distribution passages.

15. An intake manifold adapted to be employed on an engine having a pair of angularly disposed banks of cylinders, said manifold comprising a body having a carburetor riser in the center thereof with a substantially vertical fuel supply passage extending therethrough, an enlarged chamber disposed in the center of said manifold and communicating with the lower end of said fuel supply passage, a plurality of distribution passages radiating substantially horizontally from said chamber with the outer ends thereof adapted to communicate with said cylinders, the inner ends of each of said distribution passages communicating with said chamber and forming separate and independent openings into said chamber for drawing the charge therefrom.

16. An intake manifold adapted to be employed on an engine having a pair of angularly disposed banks of cylinders, said manifold comprising a body having a carburetor riser in the center thereof with a substantially vertical fuel supply passage extending therethrough, an enlarged chamber disposed in the center of said body with the upper end thereof communicating with the lower end of said fuel supply passage, said chamber including a substantially vertical cylindrical wall having a plurality of circumferentially spaced openings therein, a plurality of distribution passages radiating substantially horizontally from said chamber with the outer ends thereof adapted to communicate with said cylinders, the inner ends of said distribution passages communicating with only one of said openings in said cylindrical wall for drawing the charge substantially horizontally from said chamber.

17. An intake manifold adapted to be employed on an engine having a pair of angularly disposed banks of cylinders, said manifold comprising a body having a carburetor riser in the center thereof with a substantially vertical fuel supply passage extending therethrough, an enlarged chamber disposed in the center of said manifold, said chamber being free of any obstructions with the upper end thereof communicating with the lower end of said fuel supply passage, a plurality of distribution passages radiating from said chamber with the outer ends thereof adapted to communicate with said cylinders, the inner ends of each of said distribution passages communicating with said chamber and forming separate and independent openings in said cylindrical wall.

18. An intake manifold adapted to be employed on an engine having a pair of angularly disposed banks of cylinders, said manifold comprising a body having a carburetor riser in the center thereof with a substantially vertical fuel supply passage extending therethrough, an enlarged chamber disposed in the center of said manifold, said chamber being free of any obstructions and having the upper end thereof communicating with the lower end of said fuel supply passage, said chamber including a substantially vertical cylindrical wall and a substantially horizontal floor disposed in substantial alignment with said fuel supply passage, a plurality of distribution passages radiating from said chamber with the outer ends thereof adapted to communicate with said cylinders, the inner ends of each of said distribution passages communicating with said chamber and forming separate and independent openings in said cylindrical wall.

References Cited in the file of this patent

UNITED STATES PATENTS

| 1,916,500 | Summers | July 4, 1933 |
| 2,640,471 | Haltenberger | June 2, 1953 |

FOREIGN PATENTS

| 620,251 | Great Britain | Mar. 22, 1949 |

U. S. DEPARTMENT OF COMMERCE
PATENT OFFICE

CERTIFICATE OF CORRECTION

Patent No. 2,808,041                            October 1, 1957

John Dolza

It is hereby certified that error appears in the printed specification of the above numbered patent requiring correction and that the said Letters Patent should read as corrected below.

Column 6, line 73, for "guide" read -- engine --; column 7, line 41, for "portions" read -- portion --; column 8, line 27, after "of" insert -- each of --.

Signed and sealed this 4th day of March 1958.

(SEAL)
Attest:
KARL H. AXLINE
Attesting Officer

ROBERT C. WATSON
Commissionr of Patents